Patented May 19, 1925.

1,538,516

UNITED STATES PATENT OFFICE.

FOREST J. FUNK, OF WILMINGTON, DELAWARE, ASSIGNOR TO E. I. DU PONT DE NEMOURS & COMPANY, OF WILMINGTON, DELAWARE, A CORPORATION OF DELAWARE.

BUTYL ALCOHOL AND ACETONE FERMENTATION PROCESS.

No Drawing. Application filed February 21, 1921. Serial No. 446,764.

*To all whom it may concern:*

Be it known that I, FOREST J. FUNK, a citizen of the United States, and a resident of Wilmington, in the county of New Castle and State of Delaware, have invented a certain new and useful Butyl Alcohol and Acetone Fermentation Process, of which the following is a specification.

This invention relates to the production of butyl alcohol and acetone by fermentation of carbohydrates, and especially of the sugars occurring in molasses, and pertains more particularly to fermentations which are brought about by a micro-organism which will be hereinafter designated bacillus aceto-butylicum.

Upon an investigation of the fermentation of molasses by bacillus aceto-butylicum it was found that, although satisfactory yields of butyl alcohol and acetone could be obtained when working on a small scale, large scale fermentations could not be carried out with uniformly successful results; the yield of butyl alcohol and acetone sometimes being satisfactory, but more often quite unsatisfactory. It was finally found that the trouble was in all probability due to a persistent contamination in the form of an organism or organisms remarkably resistant to heat. The failure to detect sooner this contaminating organism, which apparently is present in all molasses, was due to two main peculiarities: First, the fact that its activities are accompanied by no visible phenomena such as evolution of gas, and, second, that it is so small as to be easily missed in a microscopic examination. The discovery of this contaminating organism served at first only to explain past failures, and for some time there was no sure way of overcoming the difficulties which it involved. This condition of affairs was due to the fact that the organism is remarkably resistant to heat, and that in order to kill it completely it was necessary to employ such a high temperature that the sugar in the molasses was sufficiently caramelized to make it unsatisfactory for use.

In my application Serial No. 414,087 filed October 1, 1920, I have described and claimed a new seeding procedure by means of which I have been able to secure consistently good yields of butyl alcohol and acetone in large scale operations from mashes containing black strap molasses as the source of sugar, with or without corn gluten as an additional nitrogen source.

The essential points of the procedure covered in my above-mentioned application consist, first, in developing the seed culture in such a manner as will result in the great majority of the butyl organisms being in the spore form at the time the seed is used to inoculate the mash; and, second, in inoculating the final mash at such a temperature—the temperature of pasteurization—that the remaining vegetative cells will be destroyed and the spores themselves so affected as to shorten their period of germination.

I have now discovered that the procedure described in my above-mentioned application may be modified mainly with respect to the second point set forth above, the modification being particularly advantageous in connection with large scale operations. This modification, broadly stated, consists essentially in inoculating the final mash at a temperature below 49° C., and preferably at the fermentation temperature of about 36.6° C., instead of inoculating this final mash at the pasteurization temperature (about 63° C.). I have also found that the preliminary treatment of the seeding solution may be carried out in a manner somewhat different from that specifically described in my prior application, but the differences here referred to are of a minor character, the conversion of the micro-organisms in the seeding solution into the spore form being still considered of prime importance.

The main objects of the present invention, as well as of the invention covered in my prior application, may be said to be the weakening of the heat-resistant contamination which I have found it impractical to destroy, and the activation of the spores of the micro-organism (particularly bacillus aceto-butylicum) so that they will germinate and produce fermentation in the shortest possible time, after being brought to the fermentation temperature.

The weakening of the heat-resistant contamination is accomplished to a sufficient extent by subjecting the molasses mash, before the seed has been added, to the ordinary sterilizing temperature, the mash when sterilized being preferably a 50% solution of molasses. If the activated seed be then added to the final mash while the latter is at a suitable fermentation temperature (for example, 36.6° C.) a satisfactory fermentation with respect to butyl alcohol and acetone production ensues.

The species of micro-organism which I prefer to use has been named bacillus aceto-butylicum. The manner of isolating this species of bacteria will be hereinafter described, but in order to facilitate their identification the species is described at this point in accordance with the descriptive chart of the Society of American Bacteriologists:—

Source—Corn meal from American maize.
Name—Bacillus aceto-butylicum.

I. Morphology.

1. Vegetable cells, motile:
Media used—nutrient agar slant containing 1% corn starch, or 5% corn media (1 part corn meal in 20 parts water), temp. 32° C., age 24 hours.
Form—short rods, chain formation.
Size—2–4 microns x 1–2 microns.
Ends—rounded.
Stain—evenly with Loeffler's methylene blue or gentian violet. Gram stain positive.

2. Sporangia:
Media used—nutrient agar slant containing 1% corn starch, temperature 32° C., after 2 days spores formed.
Form—oval. Spores central.
Limits of size—1.6 microns x 1.2 microns.
Size of majority—1.6 microns x 1.2 microns.
Spores stain poorly with Loeffler's methylene blue.

II. Cultural features.

1. Nutrient agar slant media, age 24 hours, temp. 32° C.
Growth—abundant.
Form of growth—echinulate.
Elevation of growth—raised.
Luster—dull.
Optical character—opaque.
Topography—smooth.
Odor—absent.
Consistency—viscid.
Media—clear.

2. Potato, 24 hours, 32° C.
Growth—abundant.
Form of growth—spreading.
Elevation of growth—raised.
Luster—dull.
Topography—rugose.
Odor—pleasant.
Gas formation.

6. Nutrient broth.
Surface growth—none.
Clouding—moderate.

II. Cultural features.—Continued.

Odor—none.
Sediment—slight.

7. Milk.
Coagulation prompt, with gas evolution.
Clot digested.

8. Litmus milk.
Acid, gas evolution, clot digestion.

10. Agar colonies, 24 hours, 32° C.
Growth—rapid.
Round—becoming irregular.
Surface—smooth.
Elevation—raised.
Edge—entire.
Internal structure—amorphous.

11. Starch agar (1% corn starch in nutrient agar).
Growth—abundant.
Diastatic action—marked.

17. Nitrogen source.
Proteins, peptone.

III. Physical and biochemical features.

1. Fermentation tubes.
Substances fermented with gas evolution.
Dextrose +
Saccharose +
Lactose +
Maltose +
Glycerine —
Starch +
Galatose +
Corn +
Dextrine +

7. Optimum reaction of media:
For growth and fermentation, Sorensen's $P_H$ values—5.0—6.3.

8. Vitality on culture media.
Several months at 32° C.

9. Temperature relation.
Optimum temperature 32° to 38° C.
Spores resist 80° C. for 20 minutes.

10. Resistant to drying.

13. Acids produced, butyric.

15. Alcohol, butyl.
Ketone, acetone.

Isolation of the organisms.

After a careful investigation of the subject, the procedure adopted for isolating the bacillus aceto-butylicum was as follows:

Test tubes of corn meal solution are prepared, heated to 80° C. for about twenty minutes to kill the less resistant bacteria, incubated at 32° C. without removing the air, and then watched closely for evidence of butyl alcohol fermentation. The culture in the tube or tubes which shows an active fermentation in the presence of air and yields a characteristic butyl alcohol odor, are in part transferred to a solid agar culture plate and the bacteria allowed to develop in colonies on its surface. Transfers are made from these colonies to fresh sterilized corn meal tubes and the type noted which produced the characteristic fermentation. This operation is repeated several times until agar plates are obtained which contain only the colonies of the desired type. Transfers are made to sterilized potato slabs from colonies which developed from a single organism and the bacillus is then retained in pure culture on sterilized potato by frequent transfers.

My invention may be illustrated by the following example:—One liter (or more) of a mash containing 5% by weight of corn meal is sterilized in a culture vessel, which may be a laboratory flask, at fifteen pounds steam pressure for about three hours. This mash is cooled to the fermentation temperature of 36.6° C., and inoculated with an active culture of bacillus aceto-butylicum. This corn meal mash is held at a temperature of 36.6° C. for about two days, during which time active fermentation sets in, the gluten in the corn meal rises to the surface of the liquid, remains there during the height of the fermentation, (meanwhile undergoing considerable alteration in its physical properties, becoming slimy and full of entrained bubbles of gas evolved by the fermentation), after which it drops slowly to the bottom of the container; the period of active fermentation being over, the temperature is lowered to about 31° C., at which it is maintained for a further period of about five days, during which period, presumably owing to the exhaustion of the food materials and the presence of the products of fermentation, the vegetative cells of the organism which have produced the fermentation revert for the most part to the spore form, which is the condition in which they are used in my new procedure.

Shortly before this stage is reached a solution is prepared consisting of twenty-six pounds of molasses dissolved in about 3 gallons of water, to which is added about one and one-third pounds of commercial corn gluten containing about 44% of protein. This mixture is sterilized by heating at from fifteen to twenty-five pounds steam pressure for one-half hour, after which it is diluted to a final volume of forty gallons with water sterilized by heating, by ozone, or by ultra-violet light; or it may be diluted with unsterilized water to the final volume of forty gallons, and again immediately sterilized by heating with or without pressure for a further period of one-half hour or more.

Up to this point the procedure is the same as that described in my application Ser. No. 414,087 mentioned above. Since the modifications forming the subject matter of the present application are chiefly applicable to cases where the final mash when fully diluted is at a temperature below 36.6° C., it will not be necessary in the remainder of this example to dwell upon the treatment of a final mash which has been sterilized after dilution, or which has been prepared by diluting the concentrated molasses solution with hot sterilized water.

Assuming that the dilution of the sterilized 50% molasses solution has been made with sterile cold water, the resulting mash is heated to a final temperature of about 36.6° C. The seed culture, prepared as above described, is then handled in the following way: Not less than fifteen minutes before the complete final mash will be at the fermentation temperature of 36.6° C., the seed culture is heated as rapidly as possible to the pasteurization temperature, that is, between about 57 and 77° C., for example, to approximately 63° C. This temperature is maintained for fifteen minutes, whereupon the heated seed, without previous cooling, is added as rapidly as possible to the completed final mash. Two alternative methods of heating the seed for pasteurization are possible, both of which have been tried and found to give the same results. The first of these is to inject live steam directly into the seed mash itself until the proper temperature is reached, and maintain this temperature by the injection of further steam as may be required; the second method is to heat the seed mash indirectly, either by a steam coil in the mash or by an external water or steam bath. Apparently the method of obtaining the necessary temperature does not matter. The pasteurized seed is cooled to the fermentation temperature instantly on mixing with the relatively large volume of the final mash, and fermentation follows the same course as with my former regular procedure.

A second modification which I have devised differs from the one set forth in the above example in that the final sterile mash is brought to a temperature of about 46° C., the seed added thereto without previous pasteurization, and the resulting inoculated mash maintained at this temperature for several hours, the cooling of the mash being started at such a time as will permit of the temperature of the mash reaching 36.6° C. about five hours after the addition of the seed. The temperature of the inoculated mash, according to this second modification, may vary somewhat from 46° C., a higher temperature requiring less time to activate the seed, but 46° C. has advantages from the standpoint of economy.

According to a third modification a small portion of the final mash, say 10%, is withdrawn under sterile conditions, or sterilized separately, and maintained at about 63° C. while the remainder is brought to the fermentation temperature, 36.6° C. Fifteen minutes or more before the fermentation temperature is reached in the larger portion of the final mash, the spore seed, without previous pasteurization, is added to the fraction of the mash which has been heated to 63° C. and the resulting mixture maintained at about 63° C. for fifteen minutes. The fraction containing the seed, which has been effectively pasteurized by this heat treatment, is then added to the main volume of the mash. It is sometimes desirable to have the temperature of the main portion of the mash a little below 36.6° C., say 33.3° C., so that when the smaller portion, at a temperature of 63° C., is added thereto the final mixture will be at a temperature of about 36.6° C.

A fourth modification of the process, and one which may be referred to as a "flash" method, consists essentially in heating the seed quickly to a temperature substantially higher than the ordinary pasteurization temperature, as, for example, to a temperature of 80–82.2° C., and then adding the seed, as soon as this high temperature has been reached, directly to the mash, the latter being at the fermentation temperature, 36.6° C., or thereabouts. The following example illustrates how this procedure may be operated on a commercial scale.

The molasses is sterilized in 50% solution together with the corn gluten; then blown into the fermenter, which has previously been filled with sufficient sterile water to bring the total mash after the addition of the molasses, to the desired final volume and concentration. By means of an inlet to the pipe conveying the molasses solution, the seed is admitted into the stream of hot concentrated molasses at such a rate that the temperature of the mixture before it strikes the sterile water in the fermenter shall be about 80° C. The actual time during which the seed would be subjected to this high temperature would be only a few seconds, which would be sufficient to destroy most, if not all, of the vegetative cells.

The results obtained by this flash method are not as satisfactory, when the conditions specified in the example are used, as the results obtained when working according to first three modifications above described.

The chief advantages of the modified procedures described above lie in the simplification of the apparatus required, the process described in my above mentioned application necessitating an elaborate cooling equipment for large scale operations. A considerable saving in heat energy is also effected by dispensing with the preliminary step of heating the final mash to a pasteurizing temperature of 63° C. or higher.

The underlying reasons for the adoption of the pasteurization procedures of my present, as well as of my aforesaid prior, application may be set forth briefly as follows:—

In the first place it has been found that commercial molasses (and probably other sources of sugar) contains a slightly motil organism which is extremely resistant to heat, so much so that any steam pressure treatment short of such a temperature as to caramelize the sugar and leave the molasses unfermentable, is insufficient completely to destroy this contamination. This organism produces non-volatile acid and is sufficiently active to inhibit the butyl fermentation if it gains the upper hand. It has very evidently been the cause of the failures and irregular results obtained prior to my invention.

In the second place I have found that by sterilizing the molasses in 50% solution an appreciably greater number of the organisms forming this contamination are destroyed than when the molasess is diluted to the concentration in which it is usually used in the final mash, that is, 6 to 10%, before sterilization. It is important to carry out the various mashing operations with as little delay as possible and to manipulate the mash in such a way during the entire period of preparation between the initial sterilization and the final inoculation as to preclude the possibility of any substantial recovery and growth of any surviving harmful organisms of the type described above.

In the third place, the effect of the temperature of pasteurization upon the seed added is to destroy the remaining weakened vegetative cells and to act upon the spores in such a way that they germinate more readily than is the case with the unheated spores, which usually germinate rather slowly. The germinating spores produce the new vegetative cells in the medium which is to be fermented, and these cells are, therefore, better adapted to this medium than are those which have grown in a medium of some other constitution, as for example, corn meal mash. In this way I have found it possible to ferment mashes having concentrations up to 9% of molasses with fairly uniform results.

By adding a sufficiently large number of spores, which germinate rapidly to produce the vegetative cells which are the active agents in the fermentation, the effect of the residual contamination can be largely if not entirely overcome, so that this inhibiting influence is eliminated or becomes insignificant. The butyl organisms rapidly use up the sugar, leaving the acid-forming contamination nothing upon which to act.

It is, of course, essential that all bacteriologic precautions be taken to prevent the entrance of outside contamination at any stage of this process, and for this purpose all tanks, pipe lines, valves, and other fittings must be sterilized with flowing steam or with steam under pressure prior to use. It is also essential that the apparatus and connections be so designed that it will be impossible for any pocket or dead line to remain filled with incompletely sterilized mash or residues, as such form excellent breeding places for dangerous contaminating organisms.

It has been found advisable when using corn gluten as the additional source of nitrogen to sterilize this together with the molasses in the 50% solution.

My invention is not limited to the concentration of molasses given in the example, nor to the proportion of corn gluten given in this example, nor necessarily to its use at all, nor do I consider it essential that the seed used for inoculating the molasses mash should be grown in corn meal or other grain mash, as the results of my work indicate that a molasses mash may be used in this stage with equally good results. Furthermore, I do not wish to be limited to the temperature of 63° C. at which to heat the spore seed, since I have successfully employed temperatures varying from 57° to 71° C. It will also be understood that my invention is not limited to the use of a pasteurizing temperature only at the point of inoculating the final mash, since this procedure may be used to advantage in preparing the various seed stages prior to the final fermentation.

The sugar mashes may be made from practically any source of fermentable sugar such as corn sugar, cane sugar, sugar solution obtained by hydrolysis of wood cellulose, molasses, and others, my invention being particularly applicable to any fermentable sugar or starch solution contaminated by the organism or organisms above described.

The bacillus aceto-butylicum used in the above described process is a facultative anaerobe, that is, its fermenting action is not materially influenced by a change in its environment with respect to oxygen. Consequently no effort need be made to insure the presence of air during the fermentation. The air is ordinarily excluded to a great extent by the evolution of gas from the fermenting mass, and of course air laden with bacteria is carefully excluded to prevent contamination. The advantage, however, in working with a facultative anaerobe such as the bacillus aceto-butylicum is that it is frequently more convenient to avoid contamination by filtering the air than by excluding it entirely.

Although I prefer to use for the fermentation of carbohydrates pure cultures of bacillus aceto-butylicum, my invention also includes the use of cultures obtainable from ordinary corn meal, and which remain active, and yield butyl alcohol and acetone, after being heated to 80° C. for about twenty minutes. The latter cultures or cultures derived therefrom by a few transplantations may give useful yields of butyl alcohol and acetone and yet may possibly contain species of bacteria other than, and in addition to, the bacillus acetobutylicum.

I do not limit myself to the fermentation of sugar solutions, such as molasses, by my new process, as it is equally useful in the fermentation of mashes containing higher polysaccharides, such as starch and dextrine, for example, cereal and potato mashes.

It will be clear from the above description that I use the expression "sterilized mash" or "sterlized sugar mash" to refer to a mash which has been subjected to the ordinary sterilizing treatment, such as heating with steam at 20 pounds pressure for one-half hour, and do not mean to imply that the mash so referred to is necessarily entirely free from contaminating micro-organisms. The molasses mash, with which this process is primarily concerned, even after being subjected to the ordinary sterilizing treatment appears to contain, as above indicated, a peculiar micro-organism capable of withstanding for a long time the ordinary sterilization temperatures.

I claim:—

1. The process which comprises adding to a sterilized fermentable carbohydrate mash a culture of micro-organisms, mainly in the spore form, which are derivable from ordinary corn meal, are sufficiently heat-resistant to withstand a temperature of 80° C. for about 20 minutes, and are capable of producing butyl alcohol and acetone by fermentation, in the presence of air, of a sterilized corn meal solution, said addition being made while said mash is at a fermentation temperature and with said culture at a pasteurization temperature, and then allowing fermentation to proceed.

2. The process which comprises adding to a sterlized fermentable carbohydrate mash a culture of micro-organisms, mainly in the spore form, which are derivable from ordinary corn meal, are sufficiently heat-resistant to withstand a temperature of 80° C. for about 20 minutes, and are capable of producing butyl alcohol and acetone by fermentation, in the presence of air, of a sterilized corn meal solution, said addition being made while said mash is at a fermentation temperature and immediately after said culture has been heated for a few minutes at a pasteurization temperature, and then allowing fermentation to proceed.

3. The process which comprises adding to a sterilized molasses mash a culture of micro-organisms, mainly in the spore form, which are derivable from ordinary corn meal, are sufficiently heat-resistant to withstand a temperature of 80° C. for about 20 minutes, and are capable of producing butyl alcohol and acetone by fermentation, in the presence of air, of a sterilized corn meal solution, said addition being made while said mash is at a fermentation temperature and with said culture at a pasteurization temperature, and then allowing fermentation to proceed.

4. The process which comprises adding to a sterilized sugar mash a culture of micro-organisms, mainly in the spore form, which are derivable from ordinary corn meal, are sufficiently heat-resistant to withstand a temperature of 80° C. for about 20 minutes, and are capable of producing butyl alcohol and acetone by fermentation, in the presence of air, of a sterilized corn meal solution, said addition being made while said mash is at a fermentation temperature and immediately after said culture has been heated for a few minutes at a temperature of from about 57 to 77° C., and then allowing fermentation to proceed.

5. A process as set forth in claim 1 in which the carbohydrate mash contains a vegetable protein readily assimilated by the micro-organisms which are to act as the fermenting agents.

6. A process as set forth in claim 1 in which the carbohydrate mash contains corn protein.

7. A process as set forth in claim 2 in which the carbohydrate mash contains corn protein.

8. A process as set forth in claim 3 in which the molasses mash contains corn protein.

9. A process as set forth in claim 4 in which the sugar mash contains corn protein.

10. The process which comprises heating a culture of bacillus aceto-butylicum existing in the spore form to a pasteurization temperature, shortly thereafter, and while said culture is still at a pasteurization temperature, adding said culture to a fermentable carbohydrate mash while the latter is at a fermentation temperature, and then allowing fermentation to proceed to completion.

11. The process which comprises heating a culture of bacillus aceto-butylicum existing in the spore form to a pasteurization temperature, shortly thereafter and while said culture is still at a pasteurization temperature, adding said culture to a sterilized molasses mash while the latter is at a fermentation temperature, and then allowing fermentation to proceed to completion.

12. The process which comprises heating a culture of bacillus aceto-butylicum, existing in the spore form, at a temperature between about 57 and 77° C., adding said culture while at a temperature between about 57 and 77° C. to a sterilized sugar mash maintained at a fermentation temperature and containing a vegetable protein readily assimilated by said bacillus, and then allowing fermentation to proceed.

13. The process which comprises heating a culture of bacillus aceto-butylicum, existing in the spore form, at a temperature between about 57 and 77° C., adding said culture while at a temperature between about 57 and 77° C. to a sterilized sugar mash maintained at a fermentation temperature and containing corn protein, and then allowing fermentation to proceed.

14. The process which comprises heating a culture of bacillus aceto-butylicum, existing in the spore form, for about one quarter of an hour at a temperature of about 63° C., then adding the culture to a sterilized molasses mash maintained at a fermentation temperature and containing corn protein, and allowing fermentation to proceed.

15. The process which comprises dividing a sterilized fermentable carbohydrate mash into two unequal portions, inoculating the smaller portion with a culture of bacillus aceto-butylicum existing in the spore form, maintaining the inoculated portion for a few minutes at a temperature between about 57 and 77° C., and then adding the inoculated portion to the larger portion while the latter is at such a temperature that the mash will be at about a fermentation temperature after the mixing of the two portions is completed.

16. The process which comprises dividing a sterilized molasses mash into two unequal portions, inoculating the smaller portion with a culture of bacillus aceto-butylicum existing in the spore form, maintaining the inoculated portion for a few minutes at a temperature between about 57 and 77° C., and then adding the inoculated portion to the larger portion while the latter is at such a temperature that the mash will be at about a fermentation temperature after the mixing of the two portions is completed.

In testimony whereof I affix my signature

FOREST J. FUNK.